H. A. Hutson,
Penmanship,
Nº 60,896. Patented Jan. 1, 1867.
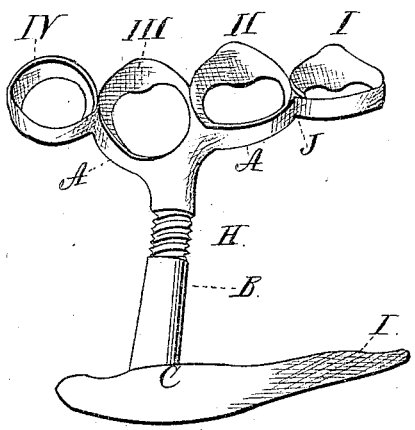
Witnesses:
Inventor:

United States Patent Office.

HENRY A. HUTSON, OF NEWBURGH, NEW YORK.

Letters Patent No. 60,896, dated January 1, 1867.

PENMAN'S ASSISTANT.

*The Schedule referred to in these Letters Patent and making part of the same.*

---

TO ALL WHOM IT MAY CONCERN:

Be it known that I, HENRY A. HUTSON, of Newburgh, county of Orange, and State of New York, have invented a new and novel instrument, which I have called Penman's Assistant, to aid in writing and learning to write; and I do hereby declare that the following is a full and exact description thereof, reference being had to the accompanying drawing, and the letters and figures marked thereon.

The nature of my invention consists in providing the fingers with rings, combined and arranged in such peculiar manner as to indicate the exact position each finger must assume, and a projecting stem and transverse stem for supporting the hand and fore-arm, and furnishing a rest for the pen-holder at the top.

To enable others to make use of my invention, I will proceed to describe its construction and use.

I construct my rings for fingers 1, 2, 3, and 4, respectively, in any manner or form desired; then combine and arrange them together by means of ring connections, or by means of a base-bar, A, upon which the rings rest. Base A, when used, serves to strengthen the rings, and though not absolutely necessary to their construction when made of metal, when constructed from gutta percha, base A must be represented. By means of these four rings, which respectively assume different attitudes, the fingers are made each to assume their exact position when the assistant is adjusted. From base A, or the inside base of rings 2 and 3, projects stem B toward the hollow of the hand to stem C, forming a support for the fingers in a lateral position, and preventing a cramped position of them while writing. Screw H serves to adjust the instrument to different-sized hand, and also to divide it for securing in a small case for the pocket. Stem C is attached to stem B transversely, forming a base in the hollow of the hand for stem B, and projecting through between the fore finger, at the knuckle joint, and the thumb, forming a crotch, J, parallel for the pen-holder at the top. The pen-holder rests toward the lower end at crotch J.

Claims.

1. I claim rings 1, 2, 3, and 4, constructed and arranged in such peculiar manner as substantially described for compelling the fingers to assume their respective positions, and to strengthen them in supporting the hand and fore-arm while writing.

2. I claim the stem B, for preventing a cramped position of the hand, by affording a prop or support to the fingers, with screw H for adjusting to different-sized hands, and for dividing the assistant to secure it in a small case for the pocket.

3. I claim stem C for projecting to form a rest at J for the pen-holder, and forming a base for stem B in the hollow of the hand.

H. A. HUTSON.

Witnesses:
A. J. NEWBY,
S. W. FULLERTON.